United States Patent Office 3,237,998
Patented Mar. 1, 1966

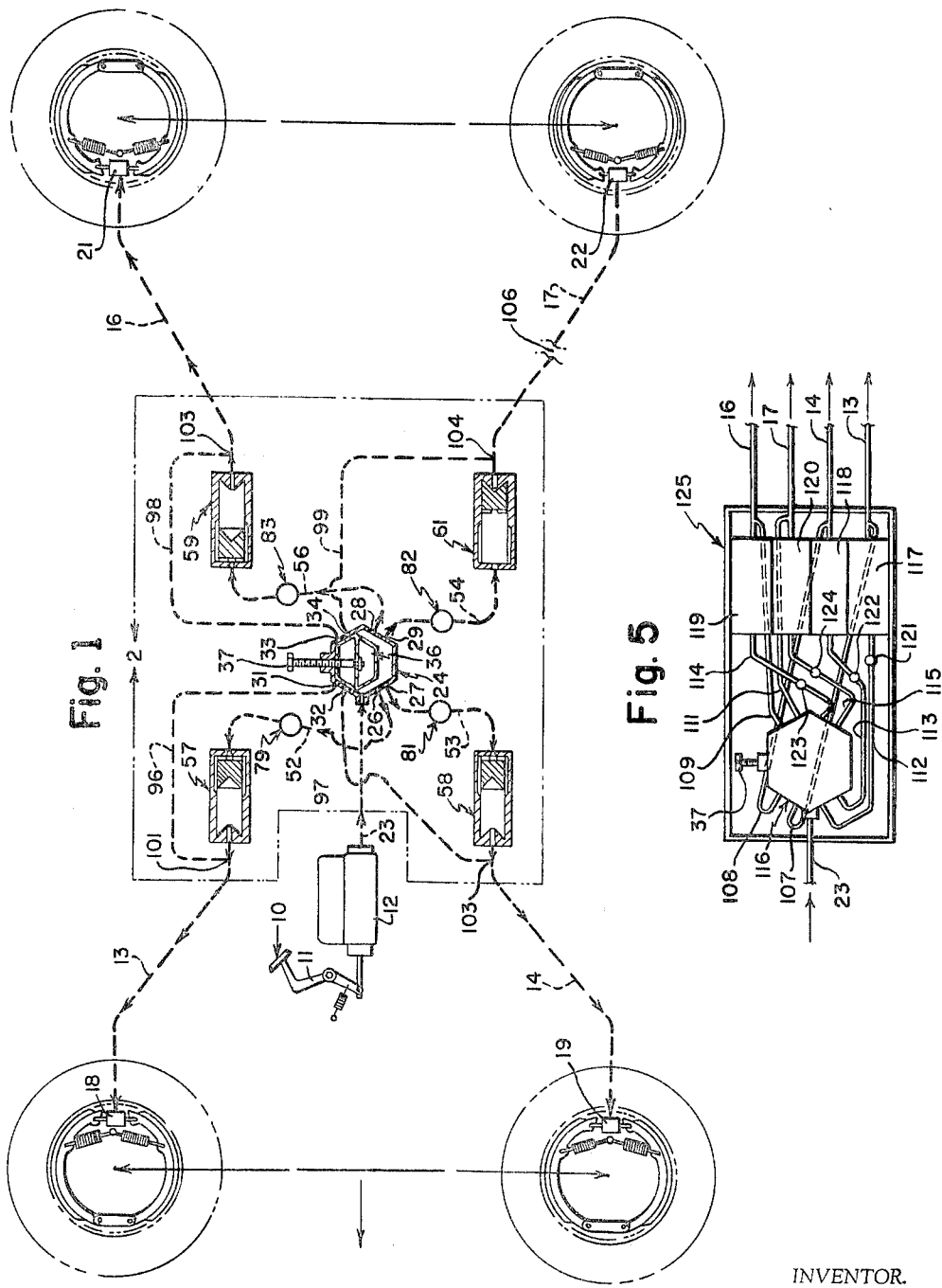

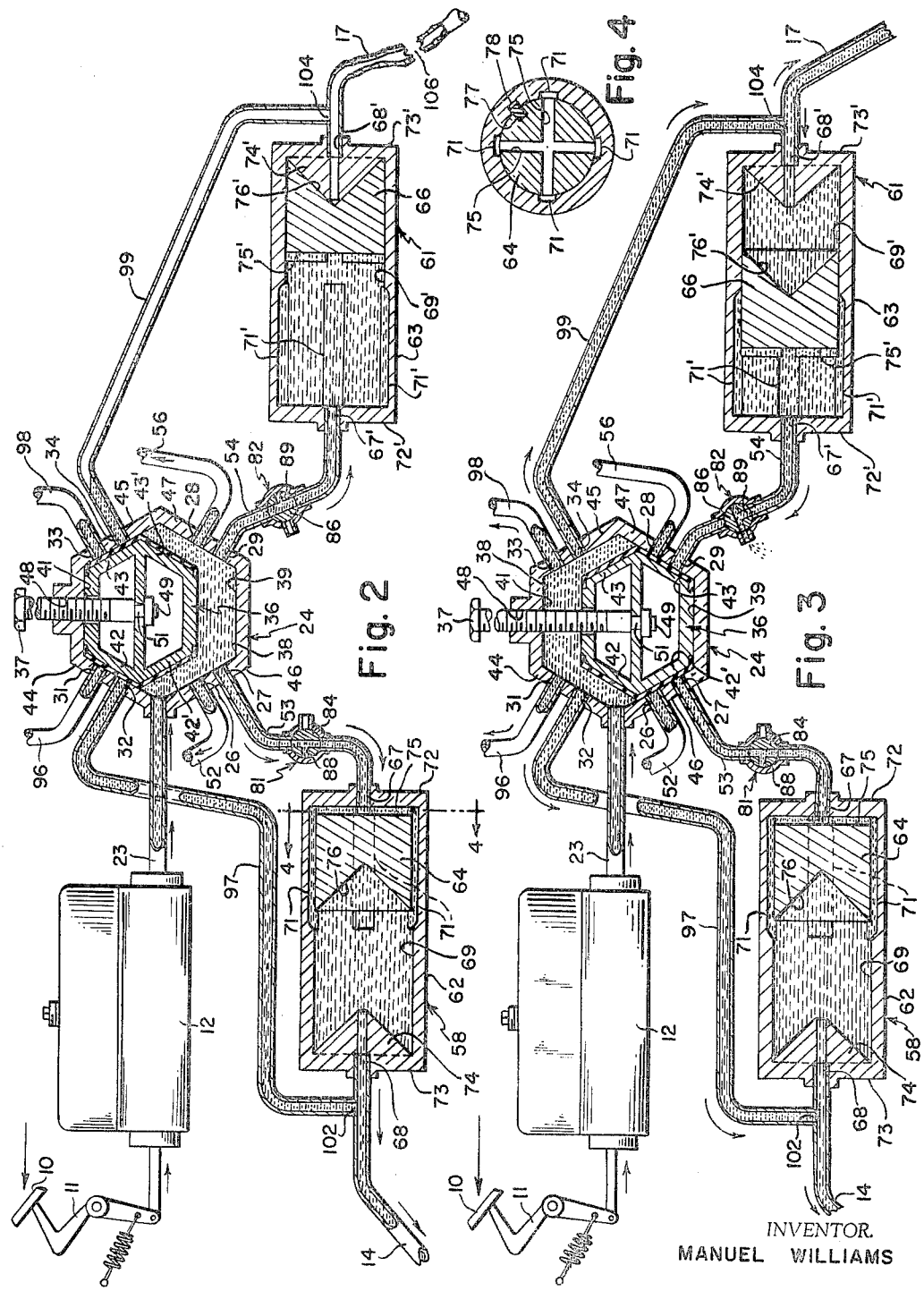

3,237,998
SAFETY DEVICE FOR HYDRAULIC BRAKE
SYSTEM
Manuel Williams, Miami, Fla.
(46—45 204th St., Queens, N.Y. 11361)
Filed Sept. 27, 1963, Ser. No. 312,063
2 Claims. (Cl. 303—84)

This invention relates to a device adapted to be included in a hydraulic brake system as a safety device.

As is perhaps well known, the conventional hydraulic brake system includes an operator's brake lever or pedal, operatively connected to a master brake cylinder, which, upon movement thereof, is adapted to transmit fluid pressure through connecting lines to a plurality of brake cylinders operatively connected to braking mechanisms for wheels. In the past, there has existed a problem because a rupture at any one point in the lines between the master cylinder and the brake cylinders results in a loss of all brake, the fluid under pressure being lost from the entire system so that the brake pressure has no transmitting medium.

It is an object of this invention to provide a means by which the effect of any rupture of a fluid pressure line in a hydraulic system between a master cylinder and one of a plurality of cylinders operatively connected to braking mechanisms will be immediately and automatically isolated without interference or interruption of fluid transmission in the remainder of the system, thus maintaining the system in operative condition for preventing accidents.

In the event such a rupture occurs, it is a further object of this invention to provide a means by which a repaired fluid line may be recharged including a device for use in recharging the system with fluid.

It is another object of this invention to provide a combination which is adaptable for installations on vehicles presently equipped with conventional hydraulic brake systems, the installation not requiring major modification of the existing system.

It is another object of this invention to provide a device of the type described hereinafter which may be installed at any convenient point between the master cylinder and pressure-responsive braking devices.

In accordance with these and other objects which will become apparent hereinafter, the instant invention will now be described with reference to the accompanying drawings illustrating a preferred embodiment thereof.

In the drawings:

FIG. 1 is a diagram which illustrates schematically the functional relationship in a closed hydraulic system of a pedal-operated master cylinder connected by lines, one of which is ruptured, to a plurality of pressure-responsive braking devices, and the instant safety device, which is connected intermediate the master cylinder and braking device in the area circumscribed by the line terminating at the arrow 2;

FIG. 2 is a diagram, partly in cross-section, which schematically illustrates the normal fluid routing system of a hydraulic system which includes the instant invention, that said diagram illustrating one of the lines being ruptured;

FIG. 3 is a diagram partly in cross-section schematically illustrating the temporary fluid routing system of a hydraulic system including the instant invention during a repair operation following the rupture of a line to one of the pressure-responsive braking mechanisms;

FIG. 4 is an end view in cross-section of a floating piston and an associated housing which are included in the instant invention, the said view being taken along the line 4—4 of FIG. 2 and looking in the direction of the arrows; and FIG. 5 is a plan view of a housing including the instant device which is adapted to be inserted intermediate the master cylinder and braking device in a hydraulic system.

Referring more particularly to the drawings, wherein like reference characters designate like or corresponding parts throughout the different views, and referring more particularly to FIG. 1, there is shown schematically a conventional hydraulic brake system of the type found in many automotive vehicles, including a brake pedal 10 and lever 11 operatively connected to a master cylinder 12 adapted to transmit fluid pressure through lines 13, 14, 16 and 17 to pressure-responsive braking mechanisms 18, 19, 21 and 22.

The instant safety device is connected to the lines intermediate the master cylinder and the individual braking mechanisms. In that area of FIG. 1 circumscribed by the line there-around designated by the numeral 2, the instant device is shown schematically to be disposed intermediate (a) the main fluid line 23 from the master cylinder 12 and (b) the respective lines 13, 14, 16 and 17 communicating with the plurality of pressure-responsive braking mechanisms 18, 19, 21 and 22 respectively. The main line 23 leads from the master cylinder 12 to a selector valve generally designated 24 which includes a body or case 25, having a first set of ports 26, 27, 28, and 29 and a second set of ports 31, 32, 33 and 34, and also includes a valve member 36 with an element 37 operative exteriorly to move the member 36 from a first position in sealing relation with the first set of ports (see FIG. 3) to a second position in sealing relation with a second set of ports (see FIG. 2), for alternatively selecting either of the two sets of ports through which fluid pressure may be transmitted. As shown, the body is hexagonal in cross-section defining a hexagonal fluid chamber 38, and the valve member is also hexagonal in cross-section and adapted to nest internally in the body either (a) against the roof 41 or (b) against the floor 39 of the chamber either (a), as shown in FIGS. 1 and 2, with the walls 42 and 43 of the member 36 overlaying and sealing the second set of ports 31, 32, 33 and 34 in the walls 44 and 45 or, (b) as shown in FIG. 3, with the walls 42' and 43' of the member 36 sealing the first set of ports 26, 27, 28 and 29 in the walls 46 and 47. The valve member is moveable between the two positions shown in FIGS. 2 and 3 respectively by means of the threaded element or stem 37 which is received in and extends outwardly from a threaded bore 48 in the body with the interiorly-disposed end 49 being journaled, as at 51, to the valve member, so that rotation of the stem 37 will raise or lower the valve member to either the first position at the limit of travel in one direction or the second position at the limit of travel in the other direction.

From the first set of ports 26, 27, 28 and 29 lines 52, 53, 54 and 56 lead to the respective inlet ports of four shut-off valves, generally designated by the numerals 57, 58, 59 and 61. In the following paragraphs, numbers will be assigned only to the components of the shut-off valves 58 and 61, since the shut-off valves 57 and 59 are similarly constructed, and the operation will be understood and described hereinafter without reference to the specific detail of these valves. The shut-off valves 58 and 61 include respectively a housing 62 and 63 and a floating piston 64 and 66 slideably disposed therein. Referring to the valve 58, the housing 62 is cylindrical in shape having an inlet port 67 at one end thereof and an outlet port 68 at the other end thereof which communicate with a chamber 69 therein. The walls of the chamber are provided with axially-extending relief grooves 71 extending from the wall 72 having the inlet port 67 to a point beyond the mid-point of the housing. The wall 73 of the housing having the outlet port 68 may be provided with a conical seat 74 extending axially into the chamber. The piston 64 is cylindrical in shape with a conical depression 76 in one end thereof, for mating with the conical seat 74, and having a plurality of diametrical grooves 75 in the other end thereof. As seen in FIG. 4, the exterior of the piston may be provided with a radially-projecting key 77 for slideable receipt in a keyway 78 in the wall of the housing to restrain rotation of the piston, limiting it to translational movement only. The construction of the valve 61 and piston 66 is similar to that of valve 58 and piston 64 and, accordingly, the features referred to by numerals in the description of the valve 58 and piston 64 have been identified in the drawings of the valve 61 and piston 66 by the same numerals followed by a prime designation.

Intermediate the first set of ports and the shut-off valves, bleed ports 79, 81, 82 and 83 are provided and include means to open and close them, such as by rotation of the members 84 and 86, each of which is provided with a T-shaped channel 88 and 89 therethrough.

From the outlet ports of the shut-off valves, the aforesaid lines 13, 14, 16 and 17, referred to hereinafter as operating lines, are provided which communicate with and are adapted to transmit fluid pressure to the pressure-responsive brake mechanism.

Another set of lines, 96, 97, 98 and 99, hereinafter referred to as repair lines, is provided from the second set of ports 31, 32, 33 and 34 of the selector valve 24 which bypass the shut-off valves and lead to the pressure-responsive brake mechanisms through the operating lines to which they are connected at junctures 101, 102, 103 and 104 intermediate the shut-off valves and brake mechanisms.

Thus, it is seen that, when the valve member 36 is in the first position, or operational position, with the first set of ports open, as in FIG. 1, application of brake pressure on the pedal 10 transmits fluid from the master cylinder and main line 23 to the selector valve 24, which permits it to travel past the bleed ports 79, 81, 82 and 83 along the lines 52, 53, 54 and 56 to the respective shut-off valves 57, 58, 59 and 61, and thence, through the operational lines to the respective braking mechanisms. In the first position, or operational position, fluid is prohibited from travel through the repair lines; however, when the valve member 36 is in the second position, as in FIG. 3, an application of fluid pressure transmitted by the brake pedal 10 will be transmitted from the selector valve 24 to the pressure-responsive brake mechanism through the repair lines, bypassing the shut-off valves.

In normal operation, the selector valve 24 will be in the position shown in FIG. 1. If a rupture or tear occurs in a line leading to one of the braking mechanisms, such as that designated 106 in the line 17 of FIG. 1, fluid will begin to leak out. Immediately prior to the rupture the piston 66 will not be in sealing relation with respect to the outlet port; however, the difference in pressure on the upstream face of the piston as compared to that on the downstream face of the piston, occasioned by the rupture, will cause the piston to move into sealing engagement with its conical depression 76' coming into mating engagement with the cone seat 74'. The aforesaid seating and sealing prohibits further leakage of fluid and isolates the ruptured line 17 so that pressure transmission to the outer mechanisms is unaffected by further fluid losses and the vehicle can proceed safely to a repair station.

At a repair station, the ruptured line 17 is replaced and the selector valve 24 moved into the second position as shown in FIG. 3 which closes the first set of outlet ports 26, 27, 28 and 29. The bleed valve 82 is then opened and fluid pressure is transmitted and applied to the conical depression 76' of the piston through the repair line 99 moving the piston 66 from its seat. Fluid can be charged to the repair line 99 by alternatively adding fluid to the master cylinder and pumping the brake lever until all lines are filled and the piston has returned to its normal position. The bleed valve 82 is then closed and the selector valve moved into the first position. The system may be bled at the wheel cylinders to eliminate any air trapped in the system.

Referring to FIG. 5, it is contemplated that repair lines 107, 108, 109 and 111 and lines 112, 113, 114 and 115 from the selector valve 116 to the respective shut-off valves, 117, 118, 119 and 120, as well as the valves, 117, 118, 119 and 120 including the selector valve 116, bleed valves 121, 122, 123 and 124 and shut-off valves, may be included within a separate housing 125 connected to and disposed adjacent the master cylinder 12. When the device is thus housed, damage to the line of the device is materially reduced and it is adapted to be readily installed on conventional brake systems.

While the instant invention has been shown and described in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A closed hydraulic system comprising; an upstream hydraulic pressure source; a selector valve connected to said source, said selector valve including a housing with two sets of outlet ports, a reciprocal member in said housing movable between a first and second position and abutting opposite surfaces of said housing for closing a different set of outlet ports in each position, and an inlet port spaced from said reciprocal member; a fluid-carrying branch line connected to each of said outlet ports on one side of said selector valve, each branch line including a braking mechanism connected to the downstream end of the branch line, a normally open sealing means intermediate the ends of said branch line, and a bleed valve between the selector valve and the sealing means, each sealing means including a body, a freely floating piston in said body to seal and restrain flow through said branch line in response to a loss of pressure on the downstream side of said sealing means, and longitudinally extending relief grooves in the upstream portion of said body for bleeding both sides of said piston by said bleed valve in response to the application of fluid and pressure on the downstream side of said sealing means; and fluid-carrying by-pass lines connected between said selector valve and each branch line downstream of said sealing means for communicating fluid and hydraulic pressure to the downstream side of each sealing means for bleeding each sealing means, said by-pass lines being connected to distinct outlet ports on the other side of said selector valve.

2. A closed hydraulic braking system, as in claim 1, wherein said selector valve includes a prismatic-shaped housing with a similarly shaped reciprocal member therein of reduced cross-sectional area movable between said first and second positions for closing one set of ports at a time.

References Cited by the Examiner

UNITED STATES PATENTS

| | | | |
|---|---|---|---|
| 2,131,653 | 6/1938 | Denis | 303—8 |
| 2,451,828 | 10/1948 | Morris | 303—84 |
| 2,529,306 | 11/1950 | Morris | 303—84 |
| 2,625,951 | 1/1953 | Owens | 303—84 X |
| 2,663,596 | 12/1953 | Brady | 303—84 |
| 2,814,532 | 11/1957 | Stephanski | 303—84 |
| 2,979,167 | 4/1961 | Denis | 303—8 |

MILTON BUCHLER, *Primary Examiner.*

FERGUS S. MIDDLETON, *Examiner.*